(12) United States Patent
Matsumura et al.

(10) Patent No.: US 12,200,092 B2
(45) Date of Patent: Jan. 14, 2025

(54) SYNCHRONOUS CONTROL APPARATUS

(71) Applicant: NIPPON TELEGRAPH AND TELEPHONE CORPORATION, Tokyo (JP)

(72) Inventors: Seiji Matsumura, Tokyo (JP); Naoki Saijo, Tokyo (JP); Makio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 171 days.

(21) Appl. No.: 17/629,251

(22) PCT Filed: Jul. 24, 2019

(86) PCT No.: PCT/JP2019/028955
§ 371 (c)(1),
(2) Date: Jan. 21, 2022

(87) PCT Pub. No.: WO2021/014601
PCT Pub. Date: Jan. 28, 2021

(65) Prior Publication Data
US 2022/0255718 A1    Aug. 11, 2022

(51) Int. Cl.
*H04L 7/00*        (2006.01)
*G06F 3/0488*      (2022.01)

(52) U.S. Cl.
CPC .......... *H04L 7/0041* (2013.01); *G06F 3/0488* (2013.01)

(58) Field of Classification Search
CPC ..... G01D 21/00; G06F 3/0482; G06F 3/0488; G06F 19/00; G08C 15/06; G08C 17/02; G08C 19/26; H04L 7/00; H04L 7/0041; H04L 29/08; H04L 67/12
USPC ........... 375/219, 295, 316, 356; 702/79, 127
See application file for complete search history.

(56) References Cited

U.S. PATENT DOCUMENTS

| 2018/0306609 | A1* | 10/2018 | Agarwal | G06N 20/10 |
| 2019/0286857 | A1* | 9/2019 | Kataoka | H04Q 9/00 |
| 2019/0287386 | A1* | 9/2019 | Kadota | G04R 20/02 |

FOREIGN PATENT DOCUMENTS

JP    201735241 A    2/2017

OTHER PUBLICATIONS

Sports Sensing Co., Ltd (2015) "Sports Sensing Synchronous Pulse Generator /Synchronous Pulse Generator II Instruction Manual" SS-WSD013-OA Ver.2.1.0.
Novelgmbh and novelelectronics inc. (2014) pedar-x system manual v.24, literature.

* cited by examiner

*Primary Examiner* — Shawkat M Ali

(57) ABSTRACT

A synchronization control device receives a trigger signal as input, outputs a first output signal for presenting a specific sensing target of a first sensor at a first time point corresponding to an input time point of the trigger signal, to a first device that presents the specific sensing target of the first sensor, and outputs a second output signal that instructs start of sensing in a second sensor different from the first sensor at a second time point corresponding to the input time point of the trigger signal, to the second sensor.

18 Claims, 12 Drawing Sheets

SYNCHRONOUS CONTROL APPARATUS

CROSS-REFERENCE TO RELATED APPLICATIONS

This application is a U.S. National Stage Application filed under 35 U.S.C. § 371 claiming priority to International Patent Application No. PCT/JP2019/028955, filed on 24 Jul. 2019, the disclosure of which is hereby incorporated herein by reference in its entirety.

TECHNICAL FIELD

The present invention relates to a technology for synchronizing data monitored by a plurality of sensors.

BACKGROUND ART

There are some cases in which data monitored by a plurality of sensors independent from each other need to be synchronized. For example, in a case of capturing video of a person making a specific motion with a camera, and monitoring an acceleration of a specific portion of that person with an acceleration sensor, the video capturing and the acceleration monitoring need to be temporally synchronized in some cases.

Herein, if these plurality of sensors have clocks synchronized with each other, it is easy to synchronize data monitored by these sensors. Alternatively, in a case in which each sensor has a function of synchronizing a clock with that of another sensor, monitored data may be synchronized using the function. For example, a sensor serving as a master may transmit a clock pulse to a synchronization device, the synchronization device may send this clock pulse to another sensor, and the other sensor may synchronize a clock with that of the sensor serving as the master based on this clock pulse (for example, see Non-Patent Literature 1, Non-Patent Literature 2, and the like).

CITATION LIST

Non-Patent Literature

Non-Patent Literature 1: SPORTS SENSING Co., LTD, "Douki Parusu Hassei Souchi Toriatsukai Setsumeisho (in Japanese) (Instruction Manual of Synchronized Pulse Generator) SS-WSD013-OA"

Non-Patent Literature 2: art. science, pedar-x system manual v. 24, p. 100, "8 PEDAR X SYNC BOXES AND SOFTWARE", August 2014

SUMMARY OF THE INVENTION

Technical Problem

However, there are some cases in which the plurality of sensors do not have clocks synchronized with each other, or each sensor does not have a function of synchronizing a clock with that of another sensor. In such a case, it is not easy to synchronize data monitored by sensors different from each other without adding a function for synchronization to the sensors.

The present invention has been made in view of such points, and has an object of synchronizing data monitored by sensors different from each other without adding a function for synchronization to the sensors even in a case in which the plurality of sensors do not have clocks synchronized with each other, or each sensor does not have a function of synchronizing a clock with that of another sensor.

Means for Solving the Problem

In order to solve the above problems, there is provided a synchronization control device including: an input unit to which a trigger signal is input; a first output unit that outputs a first output signal for presenting a specific sensing target of a first sensor at a first time point corresponding to an input time point of the trigger signal to the input unit, to a first device that presents the specific sensing target of the first sensor; and a second output unit that outputs a second output signal that instructs start of sensing in a second sensor different from the first sensor at a second time point corresponding to the input time point, to the second sensor.

Herein, since the first output signal for presenting the specific sensing target of the first sensor at the first time point corresponding to the input time point of the trigger signal is output to the first device that presents the specific sensing target of the first sensor, the specific sensing target presented at the time point in accordance with the first point is sensed in the first sensor. In addition, since the second output signal that instructs start of sensing in the second sensor at the second time point corresponding to the input time point is output to the second sensor, sensing is started in the second sensor at the time point in accordance with the second time point corresponding to the input time point. The first time point and the second time point correspond to the input time point of the trigger signal. Therefore, data obtained by the first sensor and data obtained by the second sensor can be synchronized.

Effects of the Invention

As described above, even in a case in which a plurality of sensors do not have clocks synchronized with each other, or each sensor does not have a function of synchronizing a clock with that of another sensor, data monitored by the sensors different from each other can be synchronized without adding a function for synchronization to the sensors.

DESCRIPTION OF EMBODIMENTS

Hereinafter, embodiments of the present invention will be described with reference to the drawings.

First Embodiment

Figure 1:
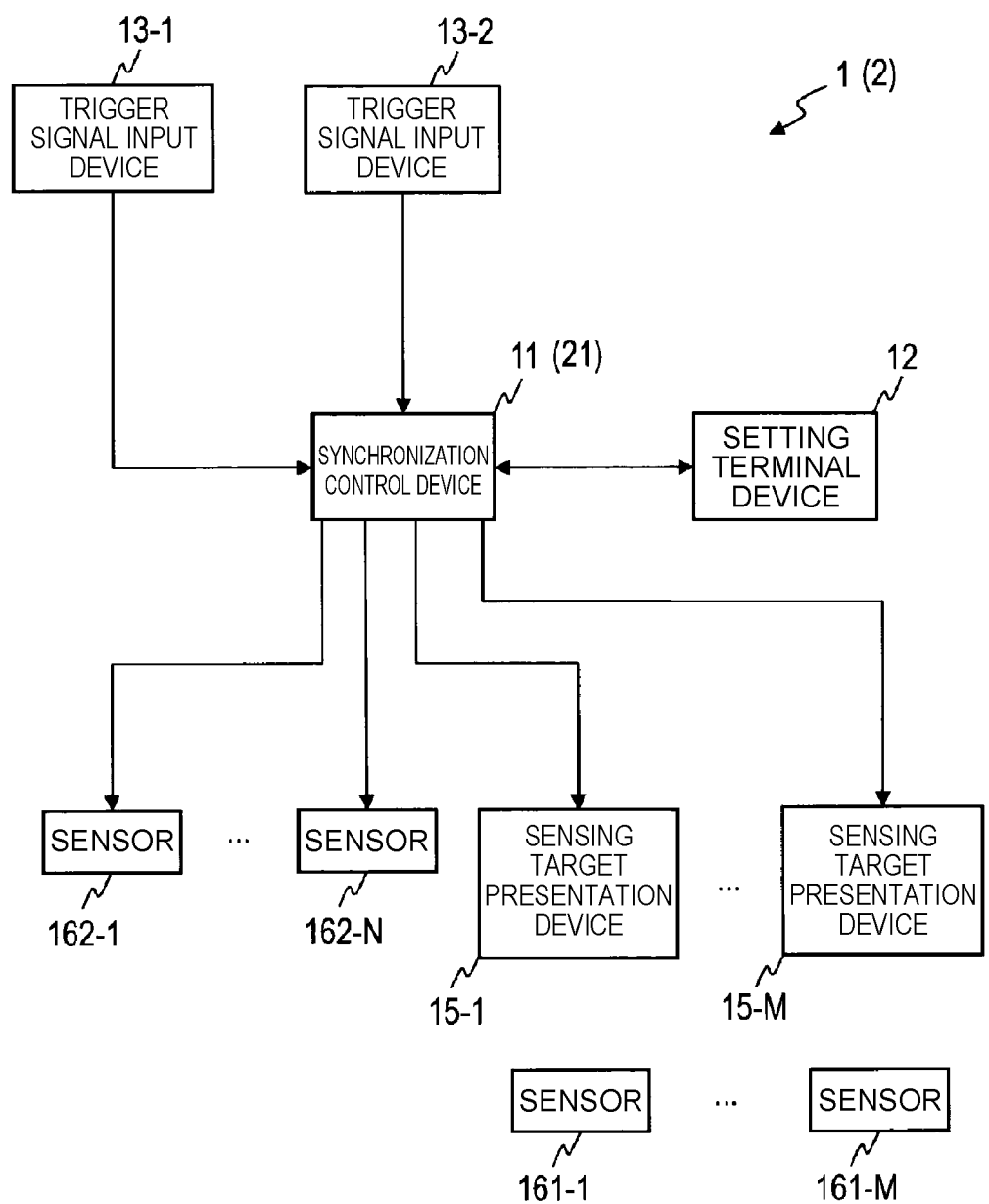
FIG. 1 is a block diagram illustrating a functional configuration of a sensing system of first and second embodiments.

A first embodiment of the present invention will be described.
<Configuration>
As illustrated in FIG. 1, a sensing system 1 of the present embodiment has a synchronization control device 11, a setting terminal device 12, trigger signal input devices 13-1, 13-2, sensing target presentation devices 15-1, ..., 15-M, and sensors 161-1, ..., 161-M, 162-1, ..., 162-N, where N and M are integers more than or equal to one.

The synchronization control device 11 is a device that performs processing for synchronizing data monitored (sensed) by the plurality of sensors 161-1, ..., 161-M, 162-1, ..., 162-N. The setting terminal device 12 is a device for performing setting for the synchronization control device 11. The setting terminal device 12 is a device configured by a general-purpose or dedicated computer including a processor (hardware processor) such as a CPU (central processing unit), a memory such as a RAM (random-access memory) or a ROM (read-only memory), and the like executing a predetermined program, for example. Examples of the setting terminal device 12 include a personal computer, a tablet terminal device, a smartphone terminal device, and the like. The trigger signal input devices 13-1, 13-2 are devices that receive a trigger. The trigger signal input device 13-1 performs wireless communication with the synchronization control device 11, and the trigger signal input device 13-2 performs wired communication with the synchronization control device 11. The sensors 161-1, ..., 161-M, 162-1, ..., 162-N are devices for sensing a physical phenomenon. The sensors 161-1, ..., 161-M continuously sense a physical phenomenon. Examples of the sensors 161-1, ..., 161-M include a camera that captures and records video, a recording device that collects sounds with a microphone and records the sounds, a biological signal measuring device that measures and records a biological signal such as pulses or an electrocardiogram, a seismometer that measures and records seismic waves, and the like. The sensors 162-1, ..., 162-N are sensors triggered by input of an output signal that instructs start of sensing to start sensing. Examples of the sensors 162-1, ..., 162-N include an acceleration sensor, a gyroscope sensor, a speed sensor, and the like. Note that the above-described examples of the sensors 161-1, ..., 161-M and the sensors 162-1, ..., 162-N are merely for illustration purposes, and may be another sensor such as a laser type distance sensor, a motion sensor, a distortion sensor, or a pressure sensor, or recording equipment. The sensing target presentation device 15-$m$ (m∈ {1, ..., M}) is a device that presents a specific sensing target of the sensor 161-$m$. The specific sensing target of the sensor 161-$m$ is a sensing target of the sensor 161-$m$, and can be identified from another sensing target of the sensor 161-$m$.

In a case in which the sensor 161-$m$ is a camera, for example, the sensing target presentation device 15-$m$ is an LED light that emits light, a display that generates and displays video, or the like. In a case in which the sensor 161-$m$ is a recording device, for example, the sensing target presentation device 15-$m$ is a speaker that outputs a sound, or the like. In a case in which the sensor 161-$m$ is a biological signal measuring device or a seismometer, for example, the sensing target presentation device 15-$m$ is a signal generation device that outputs a signal such as a pulse signal, or the like.

Figure 2:
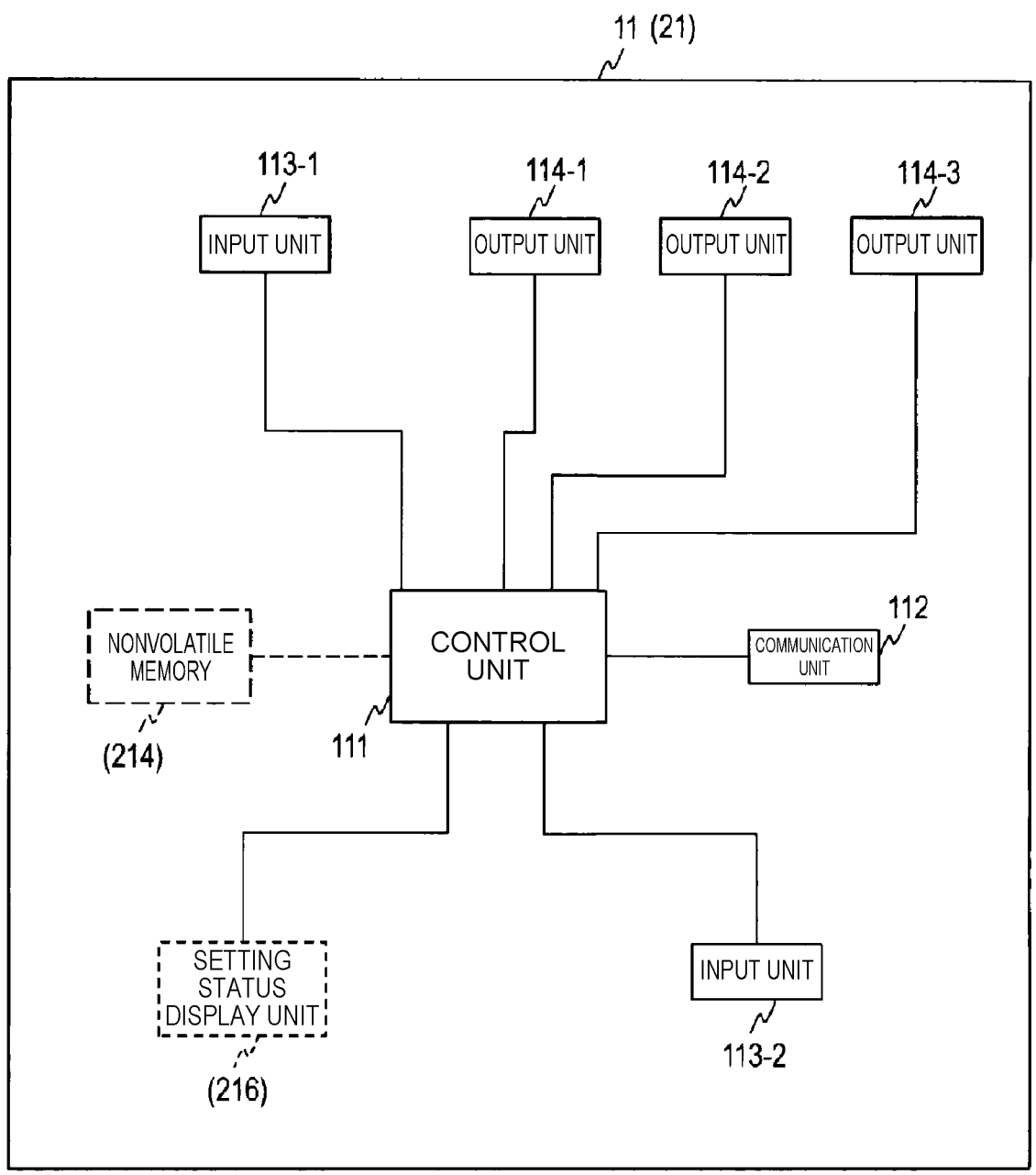
FIG. 2 is a block diagram illustrating a functional configuration of a synchronization control device of the first and second embodiments.

As illustrated in FIG. 2, the synchronization control device 11 of the present embodiment has a control unit 111, a communication unit 112, an input unit 113-1, an input unit 113-2, and output units 114-1 to 114-3. The control unit 111 is an electronic circuitry that performs various types of processing. The control unit 111 is a device configured by a general-purpose or dedicated computer including a processor such as a CPU, a memory such as a RAM or a ROM, and the like executing a predetermined program, for example. This computer may include a single processor and memory, or may include a plurality of processors and memories. This program may be installed in the computer, or may be recorded on the ROM or the like in advance. Alternatively, some or all of processing units may be configured using an electronic circuitry that implements processing functions independently, rather than an electronic circuitry, such as a CPU, that implements a functional configuration when a program is read. In addition, an electronic circuitry constituting a single device may include a plurality of CPUs. An example of the control unit 111 is a microcomputer.

The communication unit 112 is a device that performs wired or wireless communication with an external device, and is a device that performs communication with an external computer via a serial bus (for example, a USB), for example. The input unit 113-1 is a device that receives input of a trigger signal sent by wireless communication (for example, infrared, Bluetooth (R), or the like). The input unit 113-2 is a device that receives input of a trigger signal sent by wired communication (for example, a serial bus such as a USB). The output unit 114-1 outputs an output signal for presenting a specific sensing target of the sensor 161-$m$ to the sensing target presentation device 15-$m$ that presents the specific sensing target of the sensor 161-$m$. The output units 114-2, 114-3 each output an output signal that instructs start of sensing in any of the sensors 162-1, ..., 162-N to any of the sensors 162-1, ..., 162-N to be instructed to start the sensing. Only one of the output units 114-2, 114-3 may output an output signal, or the output units 114-2, 114-3 may each output an output signal.

Figure 3:
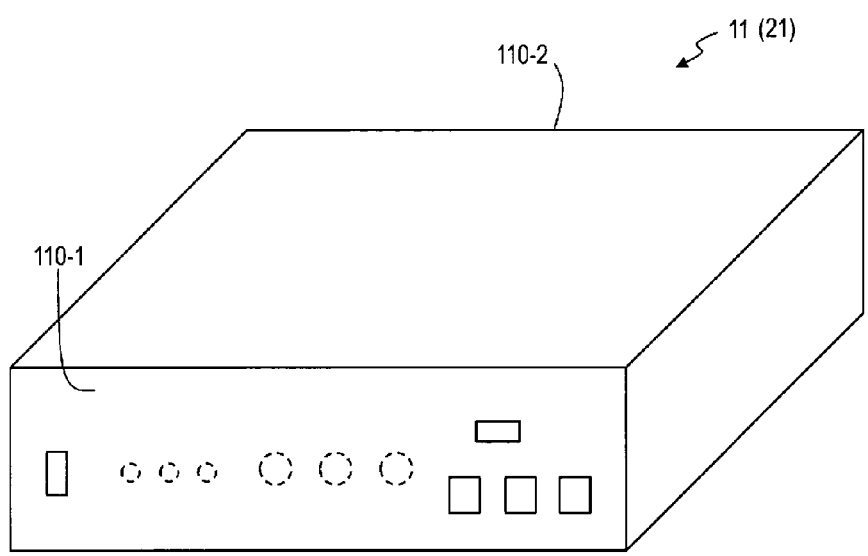
FIG. 3 is a conceptual diagram illustrating an appearance of the synchronization control device of the first and second embodiments.
Figure 4A:
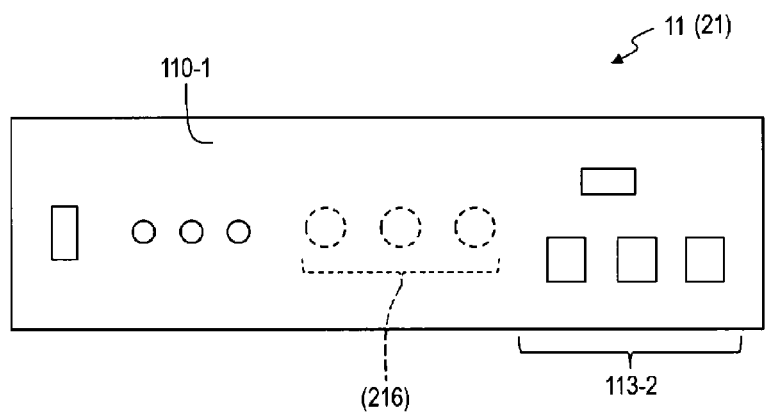
FIG. 4A is a conceptual diagram illustrating a configuration of a front panel of the synchronization control device of the first and second embodiments.
Figure 4B:
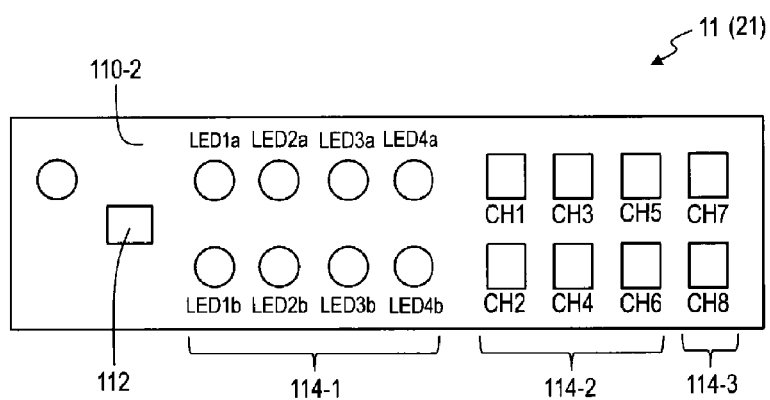
FIG. 4B is a conceptual diagram illustrating a configuration of a rear panel.

As illustrated in FIG. 3, FIG. 4A, and FIG. 4B, the synchronization control device 11 is a device in which the control unit 111, the communication unit 112, the input unit 113-1, the input unit 113-2, and the output units 114-1 to 114-3 described above are stored in an enclosure. As illustrated in FIG. 4A, the input unit 113-2 is provided on a front panel 110-1 of the synchronization control device 11. The input unit 113-2 illustrated in FIG. 4A has a connector to which the trigger signal input device 13-2 can be connected by wire. As illustrated in FIG. 4B, the communication unit 112 as well as the output units 114-1, 114-2, and 113-3 are provided on a rear panel 110-2 of the synchronization control device 11. In the example of FIG. 4B, the output unit 114-1 has eight output terminals for four channels (upper and lower two for each channel), the output unit 114-2 has six output terminals for six channels (one for each channel (CH1 to CH6)), and the output unit 114-3 has two output terminals for two channels (one for each channel (CH7, CH8)). In the example of FIG. 4B, the output terminals of the output unit 114-1 are LED output terminals, the output terminals of the output unit 114-2 are pulse voltage output terminals, and the output terminals of the output unit 114-3 are open collector output terminals of a transistor. However, these are examples, and do not limit the present invention.

<Output Signal Setting Processing>

Figure 5:
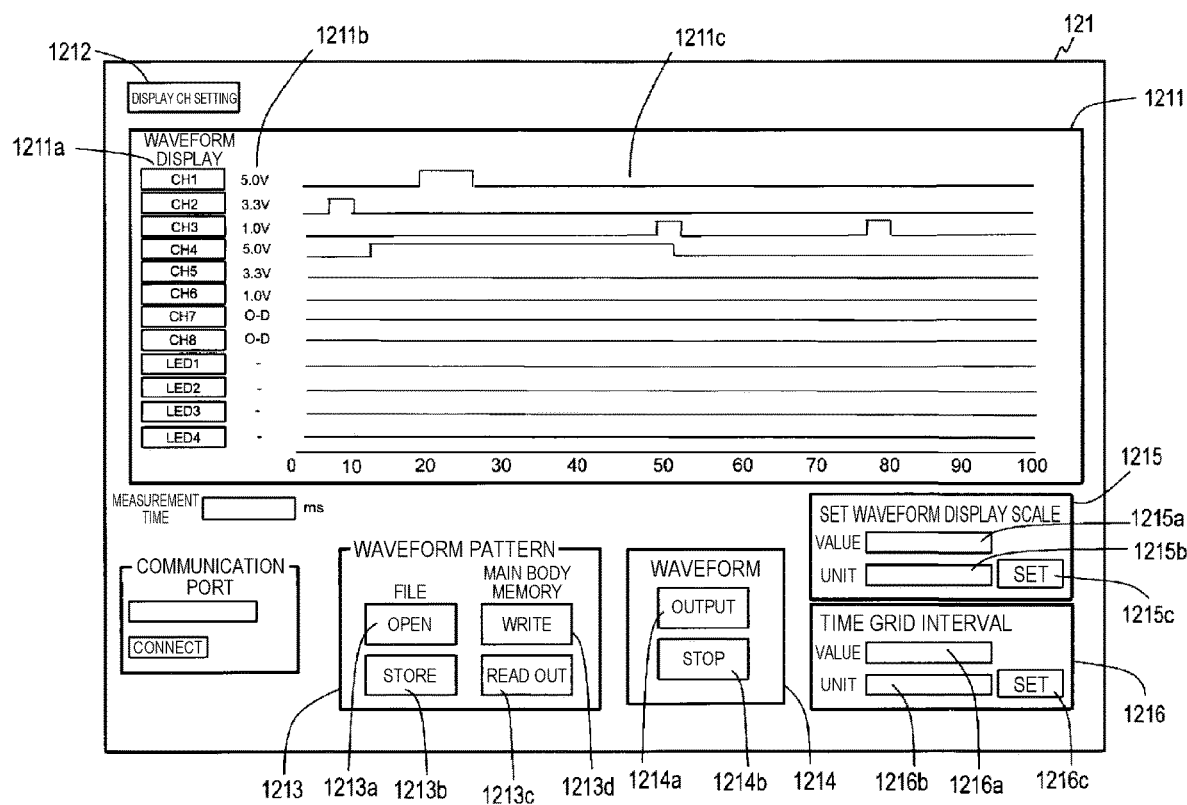
FIG. 5 is a diagram illustrating a setting screen for an output signal.
Figure 6:
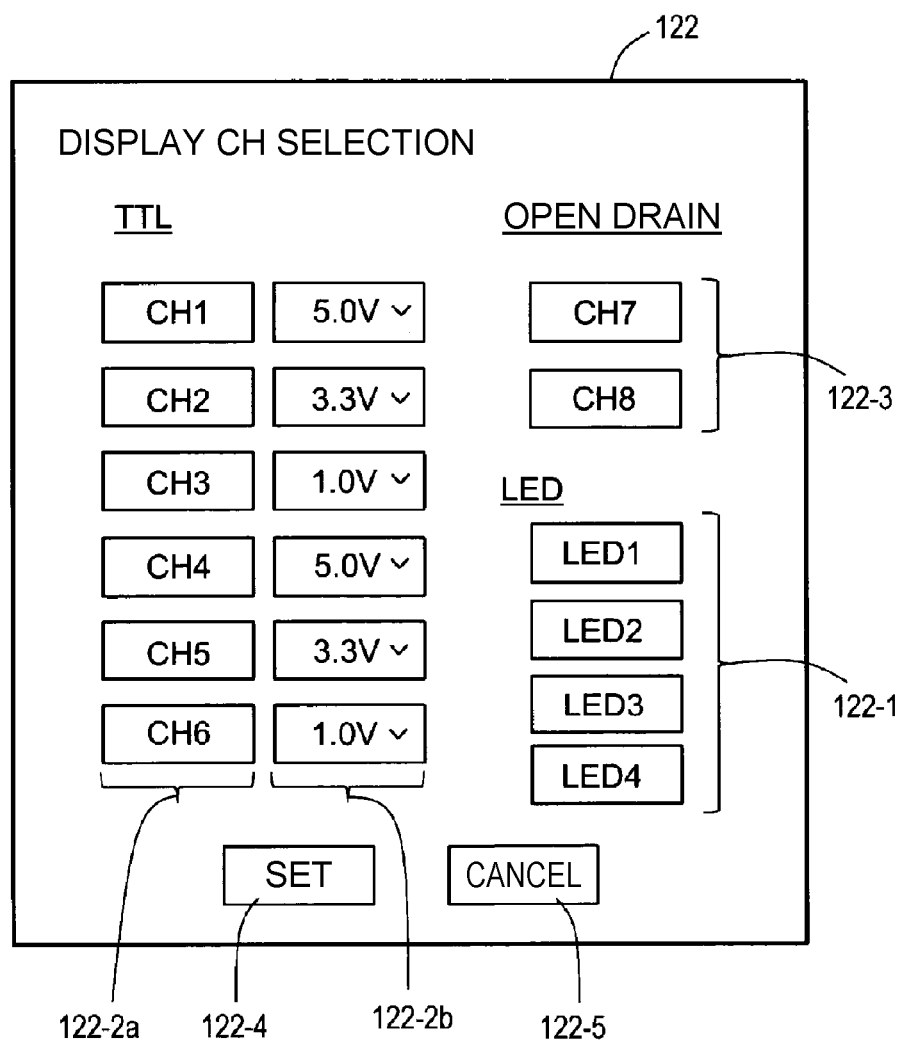
FIG. 6 is a diagram illustrating a setting screen for an output signal.
Figure 7:
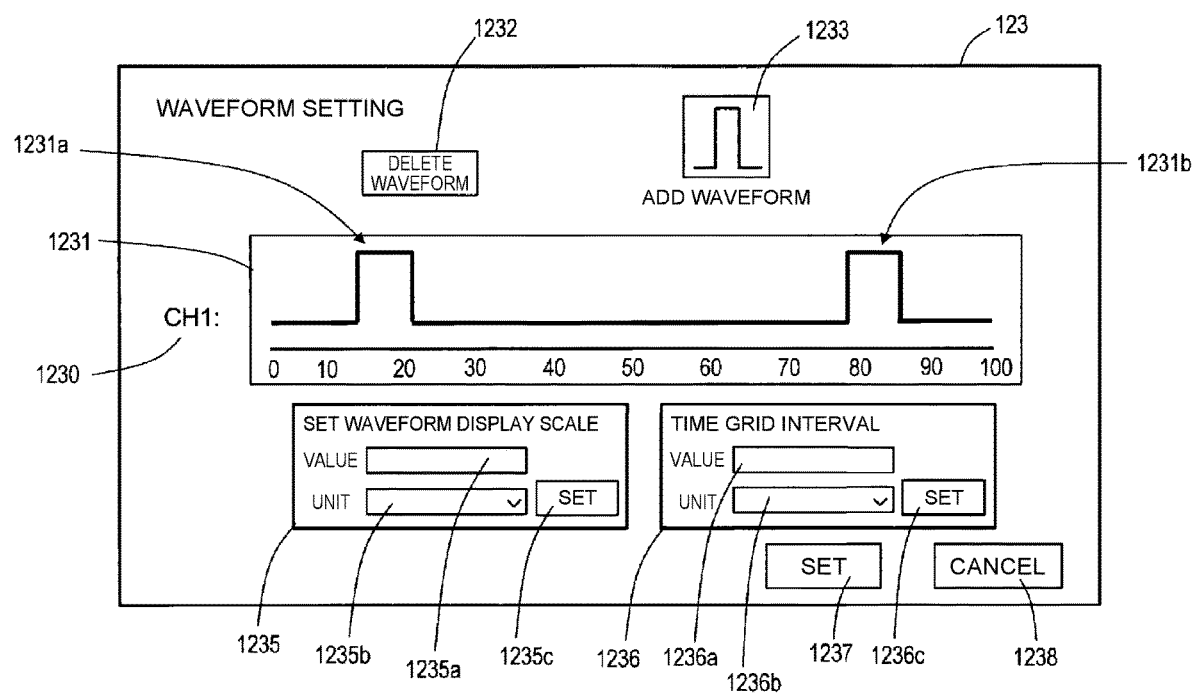
FIG. 7 is a diagram illustrating a setting screen for an output signal.

Next, setting processing for an output signal (processing of setting a waveform pattern of an output signal) to be output from the synchronization control device 11 will be described. The output signal setting processing of the present embodiment is performed using the setting terminal device 12. FIG. 5 to FIG. 7 illustrate screens displayed on an interface unit (a graphical interface unit) of the setting terminal device 12 in this setting processing. The interface unit receives an input operation (for example, a click operation, a drag operation, or the like) for setting a waveform and/or time point of an output signal. The input operation on the interface unit may be performed by a mouse operation, or may be performed by a touch operation. Hereinafter, the setting processing of the present embodiment will be described using FIG. 5 to FIG. 7.

When the setting processing is started, a screen 121 in FIG. 5 is displayed on the interface unit of the setting terminal device 12. As illustrated in FIG. 5, the screen 121 has an output signal waveform display portion 1211, a display CH setting portion 1212, a waveform pattern setting portion 1213, a waveform control portion 1214, a waveform display scale setting portion 1215, and a time grid interval setting portion 1216. The output signal waveform display portion 1211 is a portion that displays information on an output signal having been set, and has a channel display portion 1211a that represents a channel of the output signal, a pulse voltage display portion 1211b that displays a pulse voltage of the output signal, and a waveform display portion 1211c that displays a waveform pattern of the output signal. The horizontal axis of the waveform display portion 1211c is the time axis, and the vertical axis thereof represents the pulse voltage. The waveform pattern setting portion 1213 has a button 1213a to be clicked when opening a file of the output signal stored in an external storage device such as a hard disk of the setting terminal device 12, a button 1213b to be clicked when storing in a file an output waveform having been set, a button 1213d to be clicked when writing the output signal having been set into a main storage device (main body memory) of the setting terminal device 12, and a button 1213c to be clicked when reading out the output signal stored in the main storage device. The waveform control portion 1214 has a button 1214a to be clicked when outputting the output signal having been set to the synchronization control device 11, and a button 1214b to be clicked when stopping output of the output signal to the synchronization control device 11. The waveform display scale setting portion 1215 has an input portion 1215a for inputting a scale of the waveform pattern of the output signal displayed in the waveform display portion 1211c, an input portion 1215b for inputting a unit of the scale of the waveform pattern of the output signal displayed in the waveform display portion 1211c, and a button 1215c to be clicked when performing setting with values input to the input portion 1215a and the input portion 1215b. The time grid interval setting portion 1216 has an input portion 1216a for inputting a grid value of the waveform pattern of the output signal displayed in the waveform display portion 1211c, an input portion 1216b for inputting a unit of the grid value of the waveform pattern of the output signal displayed in the waveform display portion 1211c, and a button 1216c to be clicked when performing setting with values input to the input portion 1216a and the input portion 1216b.

In a case of setting an output waveform, a user first clicks the display CH setting portion 1212. When the display CH setting portion 1212 is clicked, a screen 122 in FIG. 6 is displayed. As illustrated in FIG. 6, the screen 122 has buttons 122-1 for selecting a channel for which setting of an output signal to be output from the output unit 114-1 is performed, buttons 122-2a for selecting a channel for which setting of an output signal to be output from the output unit 114-2 is performed, buttons 122-2b for selecting a pulse voltage of the output signal to be output from the output unit 114-2, buttons 122-3 for selecting a channel for which setting of an output signal to be output from the output unit 114-3 is performed, a button 122-4 to be clicked when performing setting with details selected by the buttons 122-1, 122-2a, 122-2b, and 122-3, and a button 122-5 to be clicked when cancelling these selected details.

First, by pressing buttons that the screen 122 in FIG. 6 has, the user selects a channel for which setting of an output signal is performed, and in a case of performing setting of an output signal to be output from the output unit 114-2, further selects a pulse voltage of the output signal. The channel for which setting of an output signal is performed is selected by clicking the buttons 122-1, 122-2a, 122-3 of a relevant channel. In addition, the pulse voltage of the output signal is selected by selecting a desired pulse voltage from a pulse voltage list (that is, a list of pulse voltages, for example, a list including 5.0 V, 3.3 V, and 1.0 V as elements) displayed as a tab by clicking the buttons 122-2b. In a case of performing setting of the output signal of the selected channel and pulse voltage, the user clicks the button 122-4. On the other hand, in a case of cancelling selected details of the channel or pulse voltage, the button 122-5 is clicked. In a case in which the button 122-5 is clicked, the selected details of the channel or pulse voltage are cleared. For example, in a case in which setting of an output signal to be output through CH1 of the output unit 114-2 is performed, and its pulse voltage is 5.0 V, the user clicks "CH1" in the buttons 122-2a, and further clicks a corresponding one of the buttons 122-2b to cause the pulse voltage list to be displayed as a tab, and "5.0 V" is selected therefrom. Thereafter, the user clicks the button 122-4.

When any of the buttons 122-1, 122-2a, 122-2b, and 122-3 in FIG. 6 is clicked (pressed), a transition is temporarily made to the screen 121 in FIG. 5 in a state in which only channels selected from among the buttons 122-1, 122-2a, 122-2b, and 122-3 in FIG. 6 are displayed. Thereafter, when the channel display portion 1211a that represents channels for which output signal setting is performed on the screen 121 in FIG. 5 is clicked, a screen 123 for setting an output signal of the selected channel is displayed (FIG. 7), so that the waveform of each channel can be set. As illustrated in FIG. 7, the screen 123 has a channel display portion 1230 that displays a channel for which setting of an output signal is performed (CH1 in this example), a waveform setting portion 1231 for setting a waveform pattern and a time point of the output signal, a button 1232 to be clicked when deleting a rectangular waveform (partial waveform) included in the waveform pattern of the output signal, a button 1233 to be clicked when adding a rectangular waveform that constitutes the waveform pattern, a waveform display scale setting portion 1235 to be used for setting the scale of the waveform pattern in the waveform setting portion 1231, a time grid interval setting portion 1236 to be used for setting a time grid in the waveform setting portion 1231, a button 1237 to be clicked when performing setting with details having been set, and a button 1238 to be clicked when cancelling these selected details. The waveform display scale setting portion 1235 has an input portion 1235a for inputting a scale of the waveform pattern of the output signal displayed in the waveform setting portion 1231, an input portion 1235b for inputting a unit of the scale of the waveform pattern of the output signal displayed in the waveform setting portion 1231, and a button 1235c to be clicked when performing setting with values input to the input portion 1235a and the input portion 1235b. The time grid interval setting portion 1236 has an input portion 1236a for inputting a grid value of the waveform pattern of the output signal displayed in the waveform setting portion 1231, an input portion 1236b for inputting a unit of the grid value of the waveform pattern of the output signal displayed in the waveform setting portion 1231, and a button 1236c to be clicked when performing setting with values input to the input portion 1236a and the input portion 1236b.

As illustrated in FIG. 7, the waveform pattern of the output signal includes one or more rectangular waveforms (partial waveforms). In a case of adding a rectangular waveform to the waveform pattern, the user drags the button 1233 to place a figure of the rectangular waveform at a position representing a desired time point in the waveform setting portion 1231. Accordingly, the placed rectangular waveform is added to the desired time point in the waveform pattern displayed in the waveform setting portion 1231. For example, a rectangular waveform 1231a, a rectangular waveform 1231b, and the like as illustrated in FIG. 7 are added to the waveform pattern. The initial value of the width of a rectangular waveform to be added is determined in advance. In a case of setting an output signal to be output from the output unit 114-1 or 114-3, the amplitude (pulse voltage) of a rectangular waveform to be added to the waveform pattern is determined in advance. In a case of setting an output signal to be output from the output unit 114-2, the amplitude of a rectangular waveform to be added to the waveform pattern represents a pulse voltage having been set using the buttons 122-2b in FIG. 6.

In a case of deleting a desired rectangular waveform from the waveform pattern of the output signal displayed in the waveform setting portion 1231, a rectangular waveform to be deleted is clicked and activated, and then the button 1232 is clicked. Accordingly, the selected rectangular waveform is deleted.

By dragging a rectangular waveform included in the waveform pattern displayed in the waveform setting portion 1231, the time point of the rectangular waveform can be moved. For example, by clicking and activating a rectangular waveform whose time point is to be moved, and then dragging the rectangular waveform, the user can move the time point of the rectangular waveform.

Figure 8A:
FIG. 8A and FIG. 8B are diagrams for illustrating an operation when setting an output signal.
Figure 8B:

In addition, by dragging part of the rectangular waveform included in the waveform pattern displayed in the waveform setting portion 1231, the user can change the width of the rectangular waveform. For example, in a case of changing the width of the rectangular waveform 1231b whose rising time point is $t_3$ and falling time point is $t_4$ as illustrated in FIG. 8A, the user drags one of the positions of the time point $t_3$ and the time point $t_4$ of the rectangular waveform 1231b to change the width of the rectangular waveform 1231b. For example, when dragging the position of the time point $t_4$ of the rectangular waveform 1231b in a direction A to a time point $t_5$, the falling time point can be changed to the time point $t_5$ without changing the rising time point $t_3$ of the rectangular waveform 1231b to change the width of the rectangular waveform 1231b. In this operation of changing the width of the rectangular waveform, the width of the rectangular waveform can be deformed easily since only the rising part or falling part of the rectangular waveform can be moved, and other portions are not moved. In particular, even in a case in which an operation on the interface unit is a touch operation and the width of the rectangular waveform is narrow for the size of a finger performing the touch operation, an appropriate operation can be performed.

The user can set the scale of the waveform pattern displayed in the waveform setting portion 1231 using the waveform display scale setting portion 1235. That is, by inputting a scale value to the input portion 1235a of the waveform display scale setting portion 1235, inputting a unit of the scale value input to the input portion 1235a to the input portion 1235b, and clicking the button 1235c, the user can set the scale of the waveform pattern displayed in the waveform setting portion 1231 at the scale input to the input portion 1235a and the input portion 1235b.

The user can also set a grid interval (an adjustment width of a time point of a partial waveform) of the rectangular waveform displayed in the waveform setting portion 1231 using the time grid interval setting portion 1236. That is, a placement position and moving interval of the rectangular waveform displayed in the waveform setting portion 1231 and a changing interval of the width of the rectangular waveform can be set. That is, the waveform pattern of the output signal to be set includes a plurality of rectangular waveforms (partial waveforms), and the interface unit that performs setting thereof has the time grid interval setting portion 1236 that receives input of a grid interval (an adjustment width of a time point of a partial waveform), and the waveform setting portion 1231 that displays the waveform pattern including the plurality of rectangular waveforms, and receives a drag operation performed by a mouse input or touch input for adjusting time points of some partial waveforms included in the plurality of rectangular waveforms by the adjustment width.

In a case of performing setting with details input to the waveform setting portion 1231, the waveform display scale setting portion 1235, and the time grid interval setting portion 1236, the user clicks the button 1237. Accordingly, the screen 121 (FIG. 5) that reflects the setting details is displayed. On the other hand, in a case of cancelling the details input to the waveform setting portion 1231, the waveform display scale setting portion 1235, and the time grid interval setting portion 1236, the user clicks the button 1238. Accordingly, the details input to the waveform setting portion 1231, the waveform display scale setting portion 1235, and the time grid interval setting portion 1236 are cleared.

When the above processing is repeated, the pulse voltage and waveform pattern of the output signal of each channel are set. The pulse voltage and waveform pattern of the output signal having been set are respectively displayed in the pulse voltage display portion 1211b and the waveform display portion 1211c at positions of the respective channels displayed in the channel display portion 1211a corresponding to them. The waveform patterns of the output signals having been set for the respective channels are displayed in line in a state in which the time points are matched.

The user can set the scale of the waveform pattern of the output signal displayed in the waveform display portion 1211c with the waveform display scale setting portion 1215. In this case, the user inputs a scale value of the waveform pattern to the input portion 1215a, inputs a unit of the scale value to the input portion 1215b, and clicks the button 1215c. Accordingly, the waveform pattern of the output signal is displayed in the waveform display portion 1211c at the scale set by the waveform display scale setting portion 1215.

The user can set a time grid interval of the waveform pattern of the output signal displayed in the waveform display portion 1211c with the time grid interval setting portion 1216. In this case, the user inputs a grid value of the waveform pattern to the input portion 1216a, inputs a unit thereof to the input portion 1216b, and clicks the button 1216c. Accordingly, the waveform pattern of the output signal is placed in the waveform display portion 1211c at a time grid interval set by the time grid interval setting portion 1216.

In a case of storing in a file the pulse voltage and waveform pattern of the output signal of each channel having been set, the user clicks the button 1213b. In a case of writing the pulse voltage and waveform pattern of the output signal of each channel having been set in the main body memory, the user clicks the button 1213d. In a case of opening performed for the pulse voltage and waveform pattern of the output signal of each channel stored in the file, the user clicks the button 1213a. In addition, in a case of reading out the pulse voltage and waveform pattern of the output signal of each channel having been set from the main body memory, the user clicks the button 1213c. Accordingly, the pulse voltage and waveform pattern of the output signal of each channel for which opening has been performed or which have been read out are respectively displayed in the pulse voltage display portion 1211b and the waveform display portion 1211c at positions of the respective channels displayed in the channel display portion 1211a corresponding to them.

In a case of outputting the waveform pattern of the output signal of each channel displayed in the output signal waveform display portion 1211, the user clicks the button 1214a. Accordingly, the waveform pattern of the output signal of each channel displayed in the output signal waveform display portion 1211 is transmitted to the synchronization control device 11. The transmitted waveform pattern of the output signal of each channel is received by the communication unit 112 of the synchronization control device 11, and stored in a memory (storage unit) of the control unit 111. In a case of stopping output of the waveform pattern of the output signal of each channel, the user clicks the button 1214b.

<Synchronization Control Processing>

Next, synchronization control processing performed by the synchronization control device 11 in which the waveform pattern of the output signal of each channel has been set as described above will be described. Hereinafter, it is assumed that output signals w-1, . . . , w-M output from the output unit 114-1 and the output signals ws-1, . . . , ws-N output from the output unit 114-2 or 114-3 are set, and are stored in the control unit 111. Note that the output signal w-m is a signal output to the sensing target presentation device 15-m, and the output signal ws-n (where n∈1, . . . , N) is a signal output to the sensor 162-n.

Hereinafter, it is assumed as a presupposition that the sensor 161-m is continuously sensing surrounding sensing targets, and is in a state of being able to sense a sensing target presented by the sensing target presentation device 15-m. For example, it is assumed that the sensor 161-m is a camera, and is continuously capturing and recording video of surroundings, and the sensing target presentation device 15-m is an LED light, and LED rays presented therefrom can also be captured and recorded by the sensor 161-m which is a camera. In the case of this example, the sensor 161-m continuously captures and records video of surroundings not including LED rays in a case in which the sensing target presentation device 15-m is not emitting LED rays, while the sensor 161-m continuously captures and records video of surroundings including LED rays in a case in which the sensing target presentation device 15-m is emitting LED rays. In addition, the sensors 162-1, . . . , 162-N are not performing sensing in an initial state, and only the sensor 162-n to which the output signal ws-n (where n∈1, . . . , N) has been input starts sensing.

The user provides a trigger for the trigger signal input device 13-1 or the trigger signal input device 13-2 (FIG. 1). For example, the user provides a trigger for the trigger signal input device 13-1 or the trigger signal input device 13-2 by pressing down a mechanical input button that the trigger signal input device 13-1 or 13-2 has, clicking a button displayed on a touch panel that the trigger signal input device 13-1 or 13-2 has, or the like. In a case in which the trigger is provided for the trigger signal input device 13-1, the trigger signal input device 13-1 wirelessly transmits a trigger signal indicating the fact, and this trigger signal is input to the input unit 113-1 of the synchronization control device 11 (FIG. 2). In a case in which the trigger is provided for the trigger signal input device 13-2, the trigger signal input device 13-2 transmits a trigger signal indicating the fact by wire, and this trigger signal is input to the input unit 113-2 of the synchronization control device 11.

The trigger signal input to the trigger signal input device 13-1 or the input unit 113-2 is sent to the control unit 111. The control unit 111 is triggered by sending of the trigger signal (triggered by input of the trigger signal to the input unit) to send the output signals w-1, . . . , w-M (first output signals) stored in the memory (storage unit) of the control unit 111 to the output unit 114-1 (first output unit), and send each of the output signals ws-1, . . . , ws-N (second output signals) stored in the memory to the output unit 114-2 or 114-3. Whether to send each output signal ws-n to the output unit 114-2 or to the output unit 114-3 depends on the sensor 162-n to which each output signal ws-n is output. That is, when an input standard of the sensor 162-n matches the input standard of the output unit 114-2, the output signal ws-n is sent to the output unit 114-2. On the other hand, when the input standard of the sensor 162-n matches the input standard of the output unit 114-3, the output signal ws-n is sent to the output unit 114-3.

Figure 9:
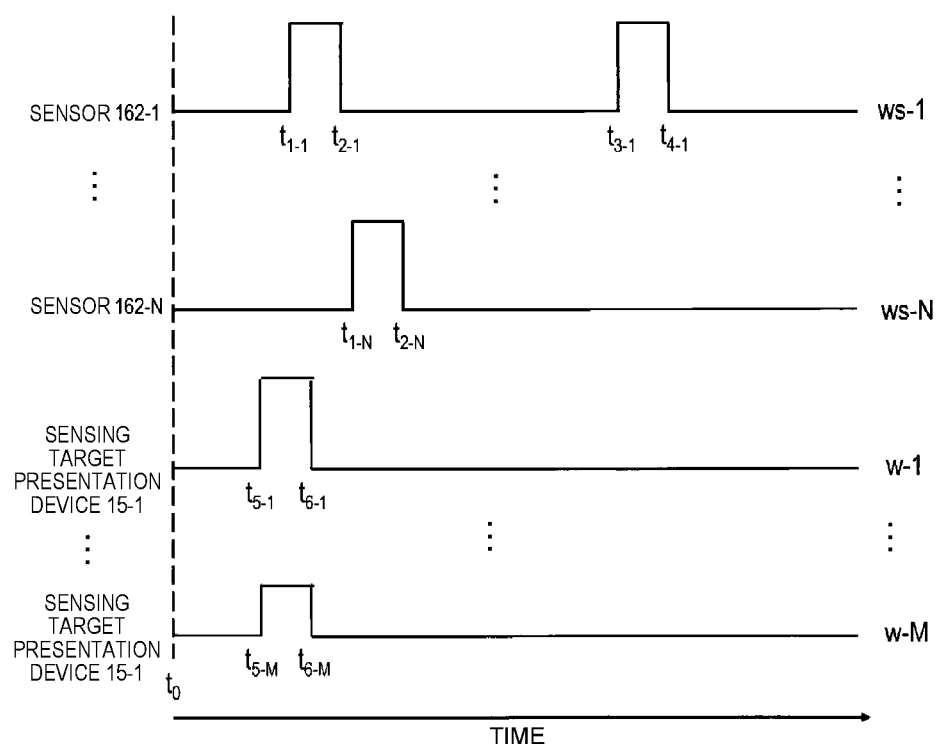
FIG. 9 is a diagram for illustrating output signals.

The output unit 114-1 (first output unit) to which the output signals w-1, . . . , w-M have been sent from the control unit 111 outputs the output signal w-m (first output signal) to the sensing target presentation device 15-m (first device). Herein, the output signal w-m is a signal for presenting a sensing target (for example, LED rays) of the sensor 161-m (first sensor) at a time point (first time point) corresponding to the time point at which the trigger signal is input to the input unit 113-1 or the input unit 113-2. The output signal w-m illustrated in FIG. 9 is a rectangular pulse that rises at a time point $t_{5\text{-}m}$ (first time point) corresponding to an input time point $t_0$ of the trigger signal, and falls at a time point $t_{6\text{-}m}$. The sensing target presentation device 15-m to which the output signal w-m has been input presents a specific sensing target of the sensor 161-m (first sensor) (for example, emits LED rays) at the time point $t_{5\text{-}m}$ (first time point), and presentation of this sensing target continues to the time point $t_{6\text{-}m}$. As described earlier, the sensor 161-m is continuously sensing surrounding sensing targets, and in a case in which the sensing target presentation device 15-m presents a specific sensing target, senses and records sensing targets including the sensing target presented by the sensing target presentation device 15-$m$. In the case in which the sensor 161-$m$ is a camera, and the sensing target presentation device 15-$m$ is an LED light, for example, the sensor 161-$m$ is continuously capturing video of surroundings, captures and records video including LED rays (video in which LED rays appear) between the time points $t_{5-m}$ and $t_{6-m}$ during which the sensing target presentation device 15-$m$ presents LED rays, and captures and records video not including LED rays at other time points.

The output unit 114-2 or 114-3 (second output unit) to which each output signal ws-n has been sent from the control unit 111 outputs each output signal ws-n (second output signal) to each sensor 162-$n$ (second sensor). Each output signal ws-n is a signal that instructs start of sensing in each sensor 162-$n$ (second sensor different from the first sensor) at a time point (second time point) corresponding to the time point at which the trigger signal is input to the input unit 113-1 or the input unit 113-2. Each output signal ws-n illustrated in FIG. 9 includes a rectangular pulse that rises at a time point $t_{1-n}$ (second time point) corresponding to the input time point $t_0$ of the trigger signal, and falls at a time point $t_{2-n}$. Each sensor 162-$n$ to which each output signal ws-n has been input starts sensing at the time point $t_{1-n}$ corresponding to the input time point $t_0$ of the trigger signal. The duration of sensing depends on the sensor type. In the case of the sensor 162-1 illustrated in FIG. 9, sensing is started at a time point $t_{1-1}$ of a rectangular pulse that rises at the time point $t_{1-1}$ and falls at a time point $t_{2-1}$, and terminates sensing at a time point $t_{3-1}$ of the next rectangular pulse that rises at the time point $t_{3-1}$ and falls at a time point $t_{4-1}$. In the case of the sensor 162-N, sensing is started at a time point $t_{1-N}$ of a rectangular pulse that rises at the time point $t_{1-N}$ and falls at a time point $t_{2-N}$. Such sensing by the sensor 162-N may be set to be terminated at a time point when sensing is terminated, or at a time point (for example, the time point $t_{2-N}$) when a predetermined time elapses after sensing is started, or at a time point when another condition is met. Each sensor 162-$n$ records data obtained by sensing.

<Characteristics of Present Embodiment>

In the present embodiment, the output unit 114-1 outputs the output signal w-m (first output signal) for presenting a specific sensing target of the sensor 161-$m$ (first sensor) at the time point $t_{5-m}$ (first time point) corresponding to the time point $t_0$ at which the trigger signal is input to the input unit 113-1 or 113-2, to the sensing target presentation device 15-$m$ (first device) that presents the specific sensing target of the sensor 161-$m$. The sensing target presentation device 15-$m$ presents the specific sensing target of the sensor 161-$m$ at the time point $t_{5-m}$ (first time point) corresponding to the input time point $t_0$. While the sensor 161-$m$ is continuously performing sensing, when the sensing target presentation device 15-$m$ presents the specific sensing target, the sensor 161-$m$ also senses the presented specific sensing target together. Accordingly, the specific sensing target presented at the time point $t_{5-m}$ (first time point) corresponding to the input time point $t_0$ is also recorded in a sensing result of the sensor 161-$m$.

In addition, the output unit 114-2 or 114-3 outputs the output signal ws-n (second output signal) that instructs start of sensing in the sensor 162-$n$ (second sensor) at the time point $t_{1-n}$ (second time point) corresponding to the time point $t_0$ at which the trigger signal is input to the input unit 113-1 or 113-2, to the sensor 162-$n$ (second sensor). Sensing is thus started in the sensor 162-$n$ (second sensor) at a time point in accordance with the time point $t_{1-n}$ (second time point) corresponding to the input time point $t_0$.

Herein, the time point $t_{5-m}$ (first time point) and the time point $t_{1-n}$ (second time point) correspond to the input time point $t_0$ of the trigger signal. Therefore, data obtained by sensing performed by the sensor 161-$m$ and data obtained by sensing performed by the sensor 162-$n$ can be synchronized. That is, the data obtained by sensing performed by the sensor 161-$m$ includes a specific sensing target (for example, LED rays) presented at the time point $t_{5-m}$ (first time point) corresponding to the input time point $t_0$. Therefore, if the specific sensing target can be detected from the data, the time point $t_{5-m}$ can be specified, and the input time point $t_0$ in the data can be specified therefrom. In addition, a start time point of the data obtained by sensing performed by the sensor 162-$n$ is a time point in accordance with the time point $t_{1-n}$ (second time point) corresponding to the input time point $t_0$. Therefore, the input time point $t_0$ can be specified from the start time point of the data.

In addition, in the present embodiment, the output signals w-1, . . . , w-M and the output signals ws-1, . . . , ws-N are set in advance by the setting terminal device 12 before the synchronization control processing of the synchronization control device 11, and are stored in the control unit 111 of the synchronization control device 11. Accordingly, the output signals w-1, . . . , w-M and the output signals ws-1, . . . , ws-N can be output from the synchronization control device 11 substantially without delay from a time point at which trigger information is input to the synchronization control device 11, and the above-described synchronization control processing can be performed with high accuracy.

Variation of First Embodiment

Although both N and M are integers more than or equal to one in the first embodiment, N may be 0 and M may be more than or equal to two. For example, a trigger signal may be input to the input unit 113-1 or 113-2, and the output unit 114-1 (first output unit) may output an output signal w-1 (first output signal) for presenting a sensing target of the sensor 161-1 (first sensor) at $t_{5-1}$ (first time point) corresponding to the time point $t_0$ at which the trigger signal is input to the input unit 113-1 or 113-2, to the sensing target presentation device 15-1 (first device) that presents the sensing target of the sensor 161-1 (first sensor), and the output unit 114-1 (second output unit) may output an output signal w-2 (second output signal) for presenting a sensing target of the sensor 161-2 (second sensor) at $t_{5-2}$ (second time point) corresponding to the time point $t_0$ at which the trigger signal is input to the input unit 113-1 or 113-2, to the sensing target presentation device 15-2 (second device) that presents the sensing target of the sensor 161-2 (second sensor). In the case in which N is 0, the sensing system 1 is not required to include the sensor 162-$n$, and the synchronization control device 11 is not required to include the output units 114-2 and 114-3.

Alternatively, M may be 0 and N may be more than or equal to two. In this case, the sensing system 1 is not required to include the sensing target presentation device 15-$m$, and the synchronization control device 11 is not required to include the output unit 114-1.

Second Embodiment

A second embodiment will be described. The second embodiment is a variation of the first embodiment. Hereinafter, differences from the first embodiment will be mainly described, and description of items common to those of the first embodiment will be simplified using the same reference numerals.

<Configuration>

As illustrated in FIG. 1, a sensing system 2 of the present embodiment has a synchronization control device 21, the setting terminal device 12, the trigger signal input devices 13-1, 13-2, the sensing target presentation devices 15-1, . . . , 15-M, and the sensors 161-1, . . . , 161-M, 162-1, . . . , 162-N, where N and M are integers more than or equal to one. As illustrated in FIG. 2, the synchronization control device 21 of the present embodiment has the control unit 111, the communication unit 112, the input unit 113-1, the input unit 113-2, the output units 114-1 to 114-3, a nonvolatile memory (for example, EEPROM or the like) 214, and a setting status display unit 216.

<Output Signal Setting Processing>

Processing in the setting terminal device 12 of the second embodiment is identical to that of the first embodiment. However, a waveform pattern of an output signal of each channel having been set by the setting terminal device 12 is transmitted to the synchronization control device 21, received by the communication unit 112, and stored in the nonvolatile memory 214 (storage unit) by way of the control unit 111. The setting status display unit 216 displays a storage status of the output signal in the nonvolatile memory 214. For example, when the setting status display unit 216 has an LED light, and an output signal is stored in the nonvolatile memory 214, the LED light of the setting status display unit 216 may be turned on, and when an output signal is not stored in the nonvolatile memory 214, the LED light may be turned off.

<Synchronization Control Processing>

In a case in which an output signal of each channel is stored in the nonvolatile memory 214 of the synchronization control device 21, the control unit 111 reads out the output signal of each channel from the nonvolatile memory 214 for storage in its own memory. Processing thereafter is identical to that of the first embodiment.

<Characteristics of Present Embodiment>

In the present embodiment, the waveform pattern of the output signal of each channel having been set by the setting terminal device 12 is stored in the nonvolatile memory 214 (storage unit) of the synchronization control device 21, so that even if a power supply of the synchronization control device 21 is turned off, the synchronization control processing can be performed without the need for the synchronization control device 21 to communicate with the setting terminal device 12 by turning on the power supply again.

[Variation of Second Embodiment]

In the second embodiment, N may be 0 and M may be more than or equal to two, or M may be 0 and N may be more than or equal to two.

Third Embodiment

Although in the first and second embodiments, an output signal is set by the setting terminal device provided outside the synchronization control devices 11, 21, the synchronization control device may be able to set the output signal. That is, the synchronization control device may have an input interface unit that receives input for setting the waveform patterns and/or time points of the first output signal and second output signal. Hereinafter, differences from the first and second embodiments will be mainly described, and description of items common to those of the first and second embodiments will be simplified using the same reference numerals.

<Configuration>

Figure 10:
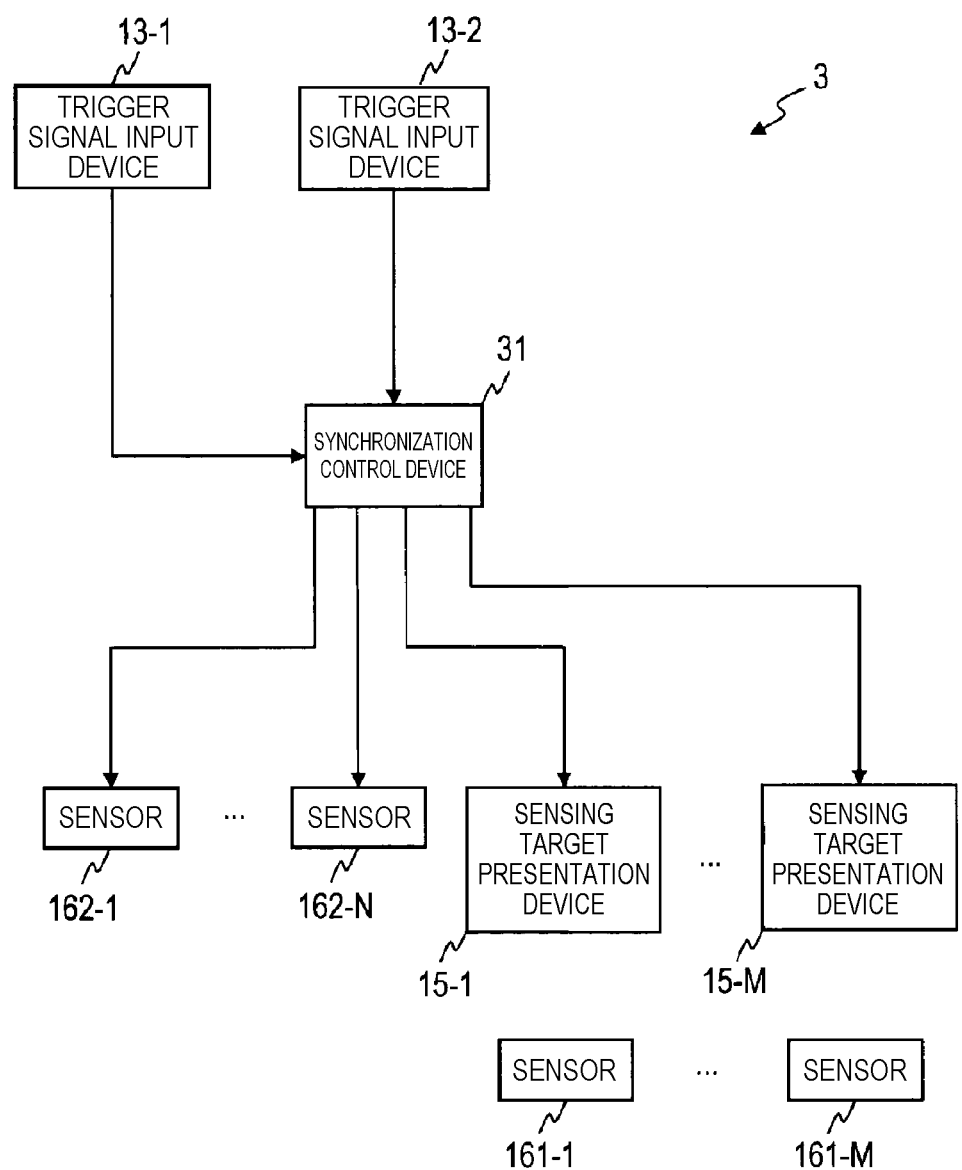
FIG. 10 is a block diagram illustrating a functional configuration of a sensing system of a third embodiment.
Figure 11:
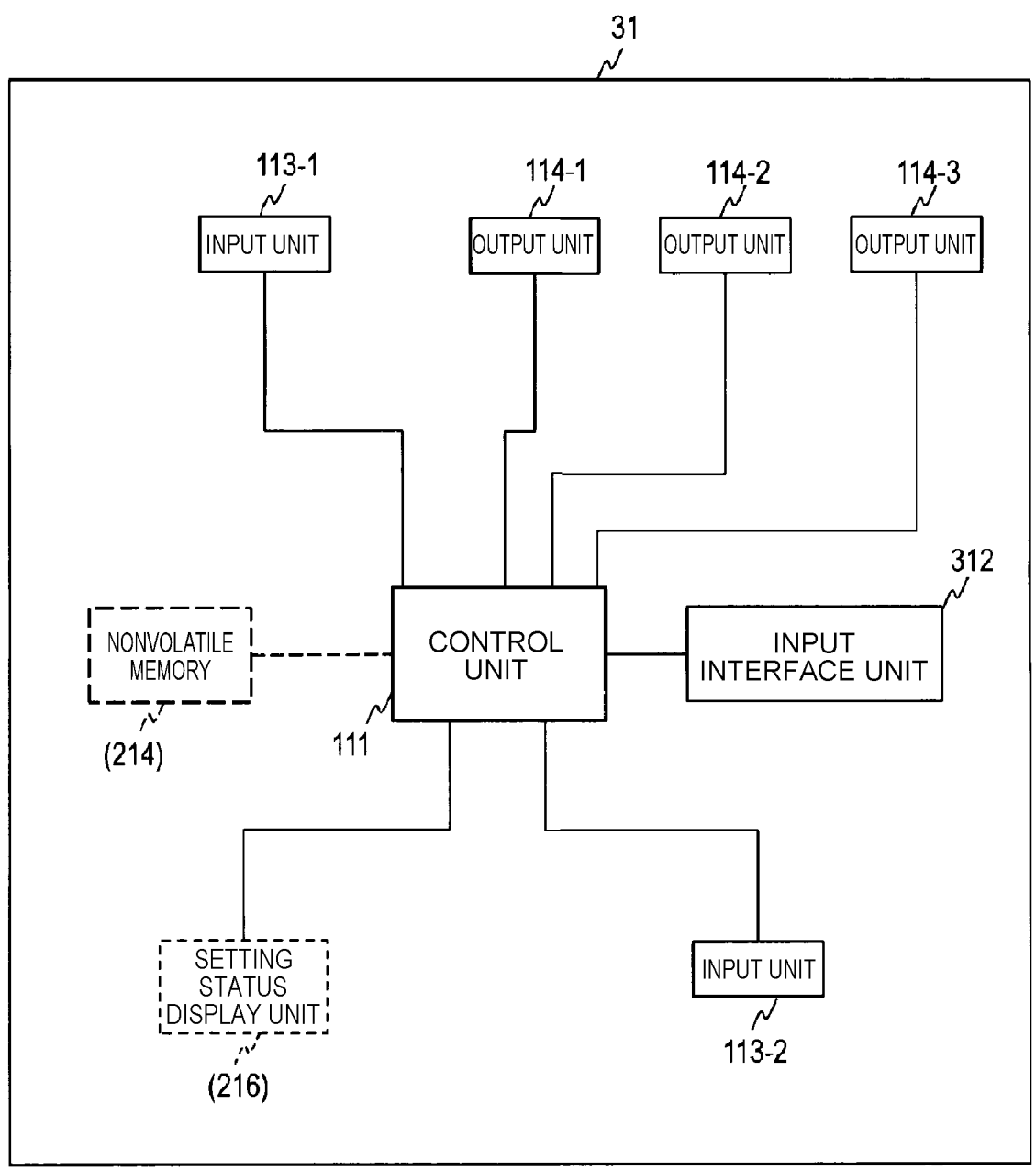
FIG. 11 is a block diagram illustrating a functional configuration of a synchronization control device of the third embodiment.
Figure 12:
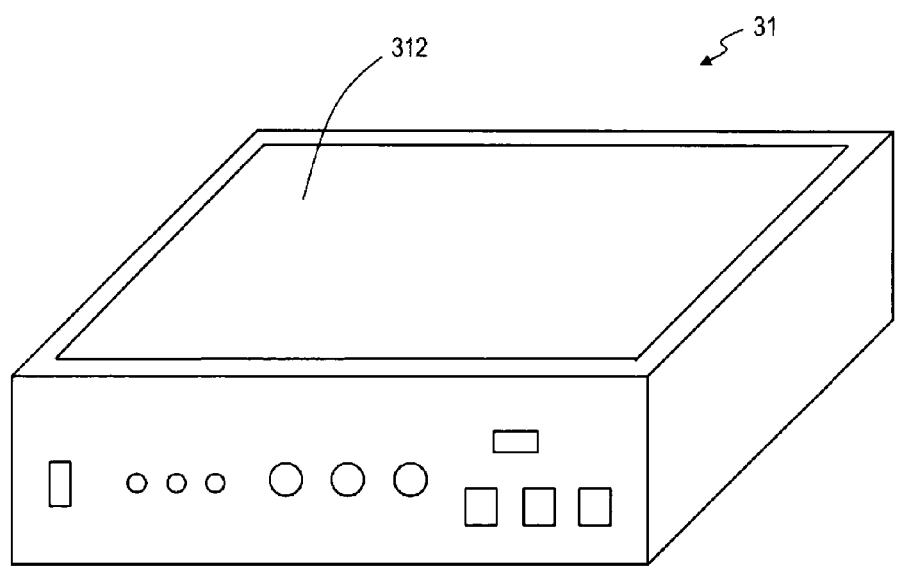
FIG. 12 is a conceptual diagram illustrating an appearance of the synchronization control device of the third embodiment.

As illustrated in FIG. 10, a sensing system 3 of the present embodiment has a synchronization control device 31, the trigger signal input devices 13-1, 13-2, the sensing target presentation devices 15-1, . . . , 15-M, and the sensors 161-1, . . . , 161-M, 162-1, . . . , 162-N, where N and M are integers more than or equal to one. As illustrated in FIG. 11, the synchronization control device 31 of the present embodiment has the control unit 111, an input interface unit 312, the input unit 113-1, the input unit 113-2, and the output units 114-1 to 114-3. Furthermore, similarly to the second embodiment, the synchronization control device 31 may further have the nonvolatile memory 214 and the setting status display unit 216. As illustrated in FIG. 12, the input interface unit 312 is an interface integrated into the synchronization control device 31. An input operation on the input interface unit 312 may be performed by a mouse operation, or may be performed by a touch operation.

<Output Signal Setting Processing>

Although in the first and second embodiments, an output signal is set by the setting terminal device 12 provided outside the synchronization control device, in the third embodiment, the output signal is set by the input interface unit 312. Details of the setting processing are identical to those in the first and second embodiments except that the setting terminal device 12 is replaced by the input interface unit 312. The output signal having been set is stored in the control unit 111. In the case in which the synchronization control device 31 has the nonvolatile memory 214, the output signal having been set may be stored in the nonvolatile memory 214. The description of the first and second embodiments applies to the remaining points.

<Synchronization Control Processing>

Processing is identical to the processing described in the first and second embodiments.

Variation of Third Embodiment

In the third embodiment, N may be 0 and M may be more than or equal to two, or M may be 0 and N may be more than or equal to two.

[Other Variations Etc.]

Note that the present invention is not limited to the above-described embodiments. For example, the above-described various types of processing are not only executed in a time-series manner in accordance with the description, but may be executed in parallel or individually depending on a processing capability of a device that executes the processing or according to necessity. In addition, modifications can be obviously made as appropriate within the scope of the present invention.

In addition, processing details of functions that the above-described control unit 111 should have may be described by a program. Then, by executing this program on a computer, the processing functions of the above-described control unit 111 are achieved on the computer. This program that describes the processing details can be recorded on a computer-readable recording medium. Examples of the computer-readable recording medium include a non-transitory recording medium. Examples of such a recording medium include a magnetic recording device, an optical disc, a magneto-optical recording medium, a semiconductor memory, and the like.

In addition, this program is distributed by, for example, selling, assigning, lending, or the like of a portable recording medium such as a DVD or CD-ROM on which the program is recorded. Furthermore, a configuration may be adopted in which this program is stored in a storage device of a server computer, and the program is forwarded from the server computer to another computer through a network so as to distribute this program.

A computer that executes such a program first stores the program recorded on a portable recording medium or forwarded from the server computer temporarily in its own storage device, for example. Then, when executing processing, this computer reads the program stored in its own storage device, and executes processing in accordance with the read program. In addition, as another implementation of this program, the computer may directly read the program from a portable recording medium to execute processing in accordance with the program, and furthermore, each time the program is forwarded to this computer from the server computer, processing in accordance with the received program may be executed sequentially. Alternatively, a configuration may be adopted in which the above-described processing is executed by what is called an ASP (Application Service Provider) type service that does not forward the program from the server computer to this computer, but achieves processing functions only by an execution instruction thereof and result acquisition. Note that the program in the present embodiment shall include information that is used for processing by an electronic computer and is equivalent to a program (data or the like that is not a direct command to a computer, but has characteristics that define processing of the computer).

In addition, in this embodiment, the present device shall be configured by causing a predetermined program to be executed on the computer, whilst at least part of these processing details may be achieved in a hardware manner.

REFERENCE SIGNS LIST 11 to 31 synchronization control device
113-1, 113-2 input unit
114-1 to 114-3 output unit
111 control unit

The invention claimed is:

1. A synchronization control device comprising circuitry configured to execute operations comprising:
receiving a trigger signal as input;
outputting a first output signal to a first device, wherein the outputting the first output signal causes presenting a specific sensing target of a first sensor at a first time point, the first time point corresponds to an input time point of the trigger signal, and the outputting the first output signal further causes the first device to present the specific sensing target of the first sensor; and
outputting a second output signal to a second sensor, wherein the second output signal comprises instructing start of sensing in the second sensor at a second time point, the second output signal is distinct from the first output signal, the second sensor is distinct from the first sensor, and the second time point corresponds to the input time point of the trigger signal.

2. The synchronization control device according to claim 1, the circuitry further configured to execute operations comprising:
storing the first output signal and the second output signal in advance;
transmitting, triggered by input of the trigger signal, the first output signal and the second output signal;
outputting the first output signal; and
outputting the second output signal.

3. The synchronization control device according to claim 2, the circuitry further configured to execute operations comprising:
receiving input for setting waveform patterns and/or time points of the first output signal and the second output signal.

4. The synchronization control device according to claim 3, wherein
the waveform patterns include a plurality of partial waveforms, and
the circuitry is further configured to execute operations comprising:
receiving an input operation for an adjustment width of time points of the plurality of partial waveforms;
displaying a waveform pattern of the waveform patterns including the plurality of partial waveforms; and
receiving a drag operation performed by a touch input for adjusting time points of one or more partial waveforms included in the plurality of partial waveforms by the adjustment width.

5. The synchronization control device according to claim 1, the circuitry further configured to execute operations comprising:
receiving input for setting waveform patterns and/or time points of the first output signal and the second output signal.

6. The synchronization control device according to claim 5, wherein
the waveform patterns include a plurality of partial waveforms, and
the circuitry is further configured to execute operations comprising:
receiving an input operation for an adjustment width of time points of the plurality of partial waveforms;
displaying a waveform pattern of the waveform patterns including the plurality of partial waveforms; and
receiving a drag operation performed by a touch input for adjusting time points of one or more partial waveforms of the plurality of partial waveforms by the adjustment width.

7. A synchronization control device comprising circuitry configured to execute operations comprising:
receiving a trigger signal as input;
outputting a first output signal to a first device, wherein the outputting the first output signal causes presenting a specific sensing target of a first sensor at a first time point, the first time point corresponds to an input time point of the trigger signal, and the outputting the first output signal further causes the first device to present the specific sensing target of the first sensor; and
outputting a second output signal to a second device, wherein the second output signal causes presenting a specific sensing target of a second sensor, the second sensor is distinct from the first sensor at a second time point, the second time point corresponds to the input time point of the trigger signal, and the second device presents the specific sensing target of the second sensor.

8. The synchronization control device according to claim 7, the circuitry further configured to execute operations comprising:
storing the first output signal and the second output signal in advance;

transmitting, triggered by input of the trigger signal, the first output signal and the second output signal;
outputting the first output signal; and
outputting the second output signal.

9. The synchronization control device according to claim 8, the circuitry further configured to execute operations comprising:
receiving input for setting waveform patterns and/or time points of the first output signal and the second output signal.

10. The synchronization control device according to claim 9, wherein
the waveform patterns include a plurality of partial waveforms, and
the circuitry is further configured to execute operations comprising:
receiving an input operation for an adjustment width of time points of the plurality of partial waveforms;
displaying a waveform pattern of the waveform patterns including the plurality of partial waveforms; and
receiving a drag operation performed by a touch input for adjusting time points of one or more partial waveforms of the plurality of partial waveforms by the adjustment width.

11. The synchronization control device according to claim 7, the circuitry further configured to execute operations comprising:
receiving input for setting waveform patterns and/or time points of the first output signal and the second output signal.

12. The synchronization control device according to claim 11, wherein
the waveform patterns include a plurality of partial waveforms, and
the circuitry is further configured to execute operations comprising:
receiving an input operation for an adjustment width of time points of the plurality of partial waveforms;
displaying a waveform pattern of the waveform patterns including the plurality of partial waveforms; and
receiving a drag operation performed by a touch input for adjusting time points of one or more partial waveforms of the plurality of partial waveforms by the adjustment width.

13. A computer-implemented method for controlling synchronization, the method comprising:
receiving a trigger signal as input;
outputting a first output signal to a first device, wherein the outputting the first output signal causes presenting a specific sensing target of a first sensor at a first time point, the first time point corresponds to an input time point of the trigger signal, and the outputting the first output signal further causes the first device to present the specific sensing target of the first sensor; and
outputting a second output signal to a second device at a second time point, wherein the second time point corresponds to the input time point of the trigger signal, the second device presents a specific sensing target of a second sensor, and the second sensor is distinct from the first sensor.

14. The computer-implemented method according to claim 13, further comprising:
storing the first output signal and the second output signal in advance;
transmitting, triggered by input of the trigger signal, the first output signal and the second output signal;
outputting the first output signal; and
outputting the second output signal.

15. The computer-implemented method according to claim 14, further comprising:
receiving input for setting waveform patterns of the first output signal and the second output signal.

16. The computer-implemented method according to claim 15, wherein
the waveform patterns include a plurality of partial waveforms, and
the method further comprises:
receiving an input operation for an adjustment width of time points of the plurality of partial waveforms;
displaying a waveform pattern of the waveform patterns including the plurality of partial waveforms; and
receiving a drag operation performed by a touch input for adjusting time points of one or more partial waveforms of the plurality of partial waveforms by the adjustment width.

17. The computer-implemented method according to claim 13, further comprising:
receiving input for setting waveform patterns of the first output signal and the second output signal.

18. The computer-implemented method according to claim 17, wherein
the waveform patterns include a plurality of partial waveforms, and
the method further comprises:
receiving an input operation for an adjustment width of time points of the plurality of partial waveforms;
displaying a waveform pattern of the waveform patterns including the plurality of partial waveforms; and
receiving a drag operation performed by a touch input for adjusting time points of one or more partial waveforms of the plurality of partial waveforms by the adjustment width.

* * * * *